US005244714A

United States Patent [19]

Malhotra et al.

[11] Patent Number: 5,244,714

[45] Date of Patent: Sep. 14, 1993

[54] COATED RECORDING SHEETS FOR ELECTROSTATIC PRINTING PROCESSES

[75] Inventors: Shadi L. Malhotra; Arthur Y. Jones, both of Mississauga, Canada

[73] Assignee: Xerox Corporation, Stamford, Conn.

[21] Appl. No.: 806,064

[22] Filed: Dec. 9, 1991

[51] Int. Cl.$^5$ .................... B32B 9/00

[52] U.S. Cl. .................... 428/195; 428/323; 428/328; 428/913; 430/69; 430/122; 430/138; 430/325

[58] Field of Search .................... 428/913, 328, 323, 195; 430/325, 69, 122, 138

[56] References Cited

U.S. PATENT DOCUMENTS

| | | | |
|---|---|---|---|
| 3,876,463 | 4/1975 | Cree | 117/218 |
| 4,196,001 | 4/1980 | Joseph et al. | 430/502 |
| 4,370,379 | 1/1983 | Kato et al. | 428/341 |
| 4,480,003 | 10/1984 | Edwards et al. | 428/329 |
| 4,711,816 | 12/1987 | Wittnebel | 428/412 |
| 4,865,914 | 9/1989 | Malhotra | 428/331 |
| 4,956,225 | 4/1987 | Malhotra | 428/216 |
| 4,997,697 | 3/1991 | Malhatra | 428/195 |
| 5,006,407 | 4/1991 | Malhotra | 428/336 |

FOREIGN PATENT DOCUMENTS

| | | |
|---|---|---|
| 0444950 | 2/1990 | European Pat. Off. . |
| 0405992 | 1/1991 | European Pat. Off. . |

*Primary Examiner*—Patrick J. Ryan
*Assistant Examiner*—Abraham Bahta
*Attorney, Agent, or Firm*—Judith L. Byorick

[57] ABSTRACT

Disclosed is a recording sheet which comprises a base sheet, an antistatic layer coated on at least one surface of the base sheet comprising a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)ethoxylated, poly (ethylene oxides), poly (n-vinyl acetamide-vinyl sulfonate salts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

20 Claims, No Drawings

COATED RECORDING SHEETS FOR ELECTROSTATIC PRINTING PROCESSES

BACKGROUND OF THE INVENTION

The present invention is directed to sheets suitable as receiving substrates in electrostatic printing and imaging processes. More specifically, the present invention is directed to coated recording sheets suitable for electrostatic printing and imaging processes which contain one or more antistatic layers and one or more toner receiving layers. One embodiment of the present invention is directed to a recording sheet which comprises a base sheet, an antistatic layer coated on at least one surface of the base sheet comprising a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)-ethoxylated, poly (ethylene oxides), poly (n-vinyl acetamide-vinyl sulfonate salts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

Electrostatic imaging processes are known. For example, the formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Other methods for forming electrostatic latent images are also known, such as ionographic methods. In ionographic imaging processes, a latent image is formed on a dielectric image receptor or electroreceptor by ion deposition, as described, for example, in U.S. Pat. Nos. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, and 4,155,093, the disclosures of each of which are totally incorporated herein by reference. Generally, the process entails application of charge in an image pattern with an ionographic writing head to a dielectric receiver that retains the charged image. The image is subsequently developed with a developer capable of developing charge images.

Many methods are known for applying the electroscopic particles to the electrostatic latent image to be developed. One development method, disclosed in U.S. Pat. No. 2,618,552, is known as cascade development. Another technique for developing electrostatic images is the magnetic brush process, disclosed in U.S. Pat. No. 2,874,063. This method entails the carrying of a developer material containing toner and magnetic carrier particles by a magnet. The magnetic field of the magnet causes alignment of the magnetic carriers in a brushlike configuration, and this "magnetic brush" is brought into contact with the electrostatic image bearing surface of the photoreceptor. The toner particles are drawn from the brush to the electrostatic image by electrostatic attraction to the undischarged areas of the photoreceptor, and development of the image results. Other techniques, such as touchdown development, powder cloud development, and jumping development are known to be suitable for developing electrostatic latent images.

Recording sheets suitable for various printing and imaging processes are also known. For example, U.S. Pat. No. 4,997,697 (Malhotra), the disclosure of which is totally incorporated herein by reference, discloses a transparent substrate material for receiving or containing an image which comprises a supporting substrate base, an antistatic polymer layer coated on one or both sides of the substrate comprising hydrophilic cellulosic components, and a toner receiving polymer layer contained on one or both sides of the antistatic layer comprising hydrophobic cellulose ethers, hydrophobic cellulose esters, or mixtures thereof, and wherein the toner receiving layer contains adhesive components.

In addition, U.S. Pat. No. 4,370,379 (Kato et al.) discloses a transfer film comprising a transparent plastic film substrate, an undercoating layer composed of an electrically conductive resin and having a surface resistance of $1.0\times10^{6}$ to $9.0\times10^{9}$ ohms, and a toner receiving layer composed of a binder resin and having a surface resistance of $1.0\times10^{10}$ to $1.0\times10^{14}$ ohms, which is formed on at least one surface of the transparent plastic film substrate through the undercoating layer.

Further, U.S. Pat. No. 4,480,003 (Edwards et al.) discloses a transparency film for use in a plain paper electrostatic copier. The transparency film comprises (a) a flexible, transparent, heat resistant, polymeric film base, (b) an image receiving layer carried upon a first major surface of the film base, and (c) a layer of electrically conductive material carried on a second major surface of the film base. Where necessary, a primer coat is interposed between the image receiving layer and the film base and/or between the layer of electrically conductive material and the film base. A protective coating is preferably applied over the layer of conductive material. The film can be used in powder-toned or liquid-toned plain paper copiers for making transparencies.

Additionally, U.S. Pat. No. 4,711,816 (Wittnebel) discloses a transparency sheet material for use in a plain paper electrostatic copier comprising (a) a flexible, transparent, heat resistant, polymeric film base, (b) an image receiving layer carried upon a first major surface of the film base, and (c) a layer of electrically conductive prime coat interposed between the image receiving layer and the film base. The sheet material can be used in powder-toned or liquid-toned plain paper copiers for making transparencies.

U.S. Pat. No. 4,865,914 (Malhotra), the disclosure of which is totally incorporated herein by reference, discloses a transparency which comprises a supporting substrate and a blend which comprises polyethylene oxide and carboxymethyl cellulose together with a component selected from the group consisting of (1) hydroxypropyl cellulose; (2) vinylmethyl ether/maleic acid copolymer; (3) carboxymethyl hydroxyethyl cellulose; (4) hydroxyethyl cellulose; (5) acrylamide/acrylic acid copolymer; (6) cellulose sulfate; (7) poly(2-acrylamido-2-methyl propane sulfonic acid); (8) poly(-vinyl alcohol); (9) poly(vinyl pyrrolidone); and (10) hydroxypropyl methyl cellulose. Papers with these coatings are also disclosed.

U.S. Pat. No. 5,006,407 (Malhotra), the disclosure of which is totally incorporated herein by reference, discloses a transparency which comprises a hydrophilic coating and a plasticizer such as a phosphate, a substituted phthalic anhydride, a glycerol, a glycol, a substituted glycerol, a pyrrolidinone, an alkylene carbonate, a sulfolane, or a stearic acid derivative. Papers having the disclosed coatings are also included in the disclosure.

U.S. Pat. No. 4,956,225 (Malhotra), the disclosure of which is totally incorporated herein by reference, discloses transparencies suitable for electrographic and xerographic imaging which comprise a polymeric substrate with a toner receptive coating on one surface comprising blends of: poly(ethylene oxide) and carboxymethyl cellulose; poly(ethylene oxide), carboxymethyl cellulose and hydroxypropyl cellulose; poly-(ethylene oxide) and vinylidene fluoride/hexafluoropropylene copolymer, poly(chloroprene) and poly(α-methylstyrene); poly(caprolactone) and poly(α-methylstyrene); poly(vinylisobutylether) and poly(α-methylstyrene); blends of poly(caprolactone) and poly(p-isopropyl α-methylstyrene); blends of poly(1,4-butylene adipate) and poly(α-methylstyrene); chlorinated poly(-propylene) and poly(α-methylstyrene); chlorinated poly(ethylene) and poly(α-methylstyrene); and chlorinated rubber and poly(α-methylstyrene). This copending application also discloses transparencies suitable for electrographic and xerographic imaging processes comprising a supporting polymeric substrate with a toner receptive coating on one surface thereof which comprises: (a) a first layer coating of a crystalline polymer selected from the group consisting of poly(chloroprene), chlorinated rubbers, blends of poly(ethylene oxide), and vinylidene fluoride/hexafluoropropylene copolymers, chlorinated poly(propylene), chlorinated poly(ethylene), poly(vinylmethyl ketone), poly(caprolactone), poly(1,4-butylene adipate), poly(vinylmethyl ether), and poly(vinyl isobutylether); and (b) a second overcoating layer comprising a cellulose ether selected from the group consisting of hydroxypropyl methyl cellulose, hydroxypropyl cellulose, and ethyl cellulose.

U.S. Pat. No. 5,068,140 (Malhotra et al.), the disclosure of which is totally incorporated herein by reference, discloses a transparent substrate material for receiving or containing an image which comprises a supporting substrate, an anticurl coating layer or coatings thereunder, and an ink receiving layer thereover.

U.S. Pat. No. 5,139,903 (Malhotra), the disclosure of which is totally incorporated herein by reference, discloses an imaged transparency comprising a supporting substrate, an oil absorbing layer which comprises, for example, chlorinated rubber, styrene-olefin copolymers, alkylmethacrylate copolymers, ethylenepropylene copolymers, sodium carboxymethyl cellulose or sodium carboxymethylhydroxyethyl cellulose, and ink receiving polymer layers comprising, for example, vinyl alcohol-vinyl acetate, vinyl alcohol-vinyl butyral or vinyl alcohol-vinyl acetate-vinyl chloride copolymers. The ink receiving layers may include therein or thereon fillers such as silica, calcium carbonate, or titanium dioxide.

U.S. Pat. No. 5,075,153 (Malhotra), the disclosure of which is totally incorporated herein by reference, discloses a never-tear coated paper comprising a plastic supporting substrate; a binder layer comprising polymers selected from the group consisting of (1) hydroxy propyl cellulose, (2) poly(vinyl alkyl ether), (3) vinyl pyrrolidone-vinyl acetate copolymer, (4) vinyl pyrrolidonedialkylamino ethyl methacrylate copolymer quaternized, (5) poly(vinyl pyrrolidone), (6) poly(ethylene imine), and mixtures thereof; a pigment or pigments; and an ink receiving polymer layer.

U.S. Pat. No. 5,137,773 (Malhotra), the disclosure of which is totally incorporated herein by reference, discloses all purpose xerographic transparencies with coatings thereover which are compatible with the toner compositions selected for development, and wherein the coatings enable images with acceptable optical densities. One disclosed transparency for ink jet printing processes and xerographic printing processes comprises a supporting substrate and a coating composition thereon which comprises a mixture selected from the classes of materials comprising (a) nonionic celluloses such as hydroxylpropylmethyl cellulose, hydroxyethyl cellulose, hydroxybutyl methyl cellulose, or mixtures thereof; (b) ionic celluloses such as anionic sodium carboxymethyl cellulose, anionic sodium carboxymethyl hydroxyethyl cellulose, cationic celluloses, or mixtures thereof; (c) poly(alkylene oxide) such as poly(ethylene oxide) together with a noncellulosic component selected from the group consisting of (1) poly(imidazoline) quaternized; (2) poly(N,N-dimethyl-3,5-dimethylene piperidinium chloride); (3) poly(2-acrylamido-2-methyl propane sulfonic acid); (4) poly(ethylene imine) epichlorohydrin; (5) poly(acrylamide); (6) acrylamide-acrylic acid copolymer; (7) poly(vinyl pyrrolidone); (8) poly(vinyl alcohol); (9) vinyl pyrrolidone-diethyl aminomethylmethacrylate copolymer quaternized; (10) vinyl pyrrolidone-vinyl acetate copolymer; and mixtures thereof. The coating compositions are generally present on both sides of a supporting substrate, and in one embodiment the coating comprises nonionic hydroxyethyl cellulose, 25 percent by weight, anionic sodium carboxymethyl cellulose, 25 percent by weight, poly(ethylene oxide), 25 percent by weight, and poly(acrylamide), 25 percent by weight. The coating can also contain colloidal silica particles, a carbonate, such as calcium carbonate, and the like primarily for the purpose of transparency traction during the feeding process.

Copending application U.S. Ser. No. 07/544,577 (Malhotra), filed Jun. 27, 1990, now U.S. Pat. No. 5,202,205 the disclosure of which is totally incorporated herein by reference, discloses transparencies for electrophotographic processes, especially xerographic processes, ink jet printing processes, dot matrix printing processes and the like, comprising a supporting substrate and an ink or toner receiving coating composition on both sides of the substrate comprising an adhesive layer polymer such as chlorinated poly(isoprene), chlorinated poly(propylene), blends of phosphate esters with poly(styrene) and the like and an antistatic layer on both sides of the adhesive layer, which antistatic layer comprises complexes of metal halides such as potassium iodide, urea compounds such as urea phosphate with polymers containing oxyalkylene units such as poly- (ethylene oxide), poly(propylene oxide), ethylene oxide/propylene oxide block copolymers, ethoxylated amines and the like, and an optional resin binder polymer such as poly(2-hydroxyethylmethacrylate), poly(2-hydroxypropylmethacrylate), hydroxypropylmethyl cellulose, or the like.

Copending application U.S. Ser. No. 07/561,430 (Malhotra), the disclosure of which is totally incorporated herein by reference, discloses a recording sheet which comprises, in the order stated, an ink receiving layer, a base sheet, a heat absorbing layer, and an anticurl layer. The recording sheet can be transparent or opaque, and can be used in a wide variety of printing and imaging processes. The recording sheet exhibits little or no curling, even after exposure to heat and/or a wide range of relative humidities.

Although known recording sheets are suitable for their intended purposes, a need remains for recording sheets that enable formation of images of excellent quality with high resolution and little or no background deposits. In addition, there continues to be a need for transparent recording sheets that enable formation of images with high optical density. Further, there is a need for transparent recording sheets suitable for use in electrostatic imaging processes and having a base sheet, one or more antistatic layers, and one or more toner receiving layers, wherein the antistatic layer and toner receiving layer exhibit excellent adhesion to the base sheet. There is also a need for recording sheets suitable for use in electrostatic imaging processes that enable excellent adhesion between the toner image and the recording sheet. Additionally, there is a need for recording sheets suitable for use in electrostatic imaging processes that can be used in more than one type of electrostatic imaging apparatus. Further, there is a need for recording sheets that do not block (stick together) under conditions of high relative humidity (for example, 50 to 80 percent relative humidity) and high temperature (for example, over 50° C.). There is also a need for transparent recording sheets suitable for use in electrostatic imaging processes that enable increased toner flow over the sheet during the imaging process. Additionally, there is a need for transparent recording sheets suitable for use in electrostatic imaging permit the substantial elimination of beading during mixing of primary colors to generate secondary colors. Further, there is a need for transparent recording sheets suitable for use in electrostatic imaging processes that exhibit substantial image permanence for extended time periods.

SUMMARY OF THE INVENTION

It is an object of the present invention to provide recording sheets suitable for electrostatic printing and imaging applications.

It is another object of the present invention to provide recording sheets that enable formation of images of excellent quality with high resolution and little or no background deposits.

It is yet another object of the present invention to provide transparent recording sheets that enable formation of images with high optical density.

It is still another object of the present invention to provide transparent recording sheets suitable for use in electrostatic imaging processes and having a base sheet, one or more antistatic layers, and one or more toner receiving layers, wherein the antistatic layer and toner receiving layer exhibit excellent adhesion to the base sheet.

Another object of the present invention is to provide recording sheets suitable for use in electrostatic imaging processes that enable excellent adhesion between the toner image and the recording sheet.

Yet another object of the present invention is to provide recording sheets suitable for use in electrostatic imaging processes that can be used in more than one type of electrostatic imaging apparatus.

Still another object of the present invention is to provide recording sheets that do not block (stick together) under conditions of high relative humidity (for example, 50 to 80 percent relative humidity) and high temperature (for example, over 50° C.)

It is another object of the present invention to provide transparent recording sheets suitable for use in electrostatic imaging processes that enable increased toner flow over the sheet during the imaging process.

It is yet another object of the present invention to provide transparent recording sheets suitable for use in electrostatic imaging processes that permit the substantial elimination of beading during mixing of primary colors to generate secondary colors.

It is still another object of the present invention to provide transparent recording sheets suitable for use in electrostatic imaging processes that exhibit substantial image permanence for extended time periods.

These and other objects of the present invention (or specific embodiments thereof) can be achieved by providing a recording sheet which comprises a base sheet, an antistatic layer coated on at least one surface of the base sheet comprising a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)-ethoxylated, poly (ethylene oxides), poly (n-vinyl acetamide-vinyl sulfonate salts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

DETAILED DESCRIPTION OF PREFERRED EMBODIMENTS

The recording sheets of the present invention comprise a base sheet, an antistatic layer coated on at least one surface of the base sheet comprising a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)-ethoxylated, poly (ethylene oxides), poly (n-vinyl acetamide-vinyl sulfonate salts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof. The base sheet for the recording sheets of the present invention can be any suitable material for receiving images. Examples include transparent materials, such as polyester, including Mylar TM, available from E.I. Du Pont de Nemours & Company, Melinex TM, available from Imperial Chemicals, Inc., Celanar™, available from Celanese Corporation, polycarbonates such as Lexan™, available from General Electric Company, polysulfones, cellulose triacetate, polyvinylchloride cellophane, polyvinyl fluoride, and the like, with polyester such as Mylar™ being preferred in view of its availability and relatively low cost. The base sheet can also be opaque, such as paper, including plain papers such as Xerox® 4024, diazo papers, or the like, or opaque plastics and filled polymers, such as Melinex®, available from ICI. The base sheet can be of any effective thickness. Typical thicknesses for the base sheet are from about 50 to about 125 microns, and preferably from about 100 to about 125 microns, although the thickness can be outside these ranges.

The antistatic layer can be present either on one surface of the base sheet or on both surfaces of the base sheet. This antistatic layer comprises a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)-ethoxylated, poly (ethylene oxides), poly (n-vinyl acetamide-vinyl sulfonate salts), melamine-formaldehyde resins, urea-formaldehyde resins, styrene-vinylpyrrolidone copolymers, and mixtures thereof. Specific examples of suitable hydrophilic polysaccharides include (1) cellulose ester salts, such as sodium derivatives of cellulose phosphate ester (including those available from James River Chemicals), cellulose phosphate, available from CTC organics, sodium cellulose sulfate, available from Janssen Chimica, cellulose carbonate, available from Sigma Chemicals, sodium ethyl cellulose (which can be obtained by the reaction of alkali cellulose with sodium chloroethane sulfonate), and the like; (2) cellulose ethers and their salts, such as sodium carboxymethylcellulose (including CMC 7HOF, available from Hercules Chemical Company), sodium carboxymethylhydroxyethyl cellulose (including CMHEC 43H™ and 37L, available from Hercules Chemical Company; CMHEC 43H™ is believed to be a high molecular weight polymer with carboxymethyl cellulose (CMC)/hydroxyethyl cellulose (HEC) ratio of 4:3, and CMHEC 37L is believed to be of lower molecular weight with a CMC/HEC ratio of 3:7), carboxymethylmethyl cellulose, available from Aqualon Company, carboxymethyl cellulose calcium salt, available from Pfaltz and Bauer Inc., carboxymethyl cellulose ether sodium salt, available from E.M. Science Company, carboxymethyl cellulose hydrazide, available from Sigma Chemicals, sodium sulfoethyl cellulose (which can be prepared by the reaction of sodium vinyl sulfonate with alkali cellulose), and the like; (3) cationic cellulose ethers, such as diethyl aminoethyl cellulose (including DEAE cellulose, available from Poly Sciences Inc.), cationic hydroxyethyl celluloses, such as diethyl ammonium chloride hydroxyethylcellulose and hydroxypropyl triethyl ammonium chloride hydroxyethylcellulose (available as Celquat H-100 and L-200 from National Starch and Chemical Company and as Polymer JR series from Union Carbide Company), and the like; (4) hydroxyalkyl celluloses, such as hydroxyethyl cellulose (including Natrosol 250 LR, available from Hercules Chemical Company), hydroxypropyl methyl cellulose, such as Methocel™ K35LV, available from Dow Chemical Company, hydroxypropyl hydroxyethyl cellulose, available from Aqualon Company, dihydroxypropyl cellulose (which can be prepared by the reaction of 3-chloro-1,2-propane diol with alkali cellulose), and the like; (5) substituted deoxycelluloses, such as chlorodeoxycellulose (which can be prepared by the reaction of cellulose with sulfuryl chloride in pyridine and $CHCL_3$ at 25° C.), amino deoxycellulose (which can be prepared by the reaction of chlorodeoxycellulose with 19 percent alcoholic solution of ammonia for 6 hours at 160° C.), deoxycellulose phosphate (which can be prepared by the reaction of tosyl cellulose with triethyl phosphate in dimethyl formamide at 85° C.), deoxy cellulose phosphonium salt (which can be prepared by the reaction of tosyl cellulose with tris(hydroxy methyl) phosphine), and the like; (6) dextran polymers, such as carboxymethyl dextran (including #16058, available from Poly Sciences Inc.), diethyl aminoethyl dextran, such as #5178, available from Poly Sciences Inc., dextran sulfate, available from Sigma Chemical Company, dextran sulfate potassium salt, available from Calibiochem Corporation, dextran sulfate sodium salt, available from Poly Sciences Inc, amino dextran, available from Molecular Probes Inc., dextran polysulfonate sodium salt, available from Reseach Plus Inc., and the like; (7) natural ionic gums and their modifications, such as alginic acid sodium salt (including #032, available from Scientific Polymer Products), alginic acid ammonium salt, available from Fluka Chemie AG, alginic acid calcium salt, available from Fluka Chemie AG, alginic acid calcium sodium salt, available from American Tokyo Kasei Inc., gum arabic, available from Sigma Chemicals, Carrageenan sodium salt, available from Gallard-Schless Inc., carboxymethyl hydroxypropyl guar, available from Aqualon Company, cationic gum guar, available as Celanese Jaguars C-14-S, C-15, and C-17 from Celanese Chemical Company, Karaya gum, available from Sigma Chemicals, Xanthan gum, available as Keltrol-T from Kelco division of Merck and Company, Chitosan, available from Fluka Chemie AG, n-carboxymethyl chitin, and the like; (8) protein polymers, such as dimethylammonium hydrolyzed collagen protein, available as Croquats from Croda, agar-agar, available from Pfaltz and Bauer Inc., amino agarose, available from Accurate Chemical and Scientific Corporation, and the like; (9) n-carboxymethyl amylose sodium salt, available from Sigma Chemicals; and the like, as well as mixtures thereof.

The antistatic layer also contains a second component. Examples of suitable materials for this second component include poly (vinyl amine), such as #1562, available from Poly Sciences Inc., poly (vinyl phosphate), such as #4391, available from Poly Sciences Inc., poly (vinyl alcohol), such as Elvanol, available from E. I. Du Pont de Nemours & Company, poly (vinyl alcohol) ethoxylated, such as #6573, available from Poly Sciences Inc., poly (ethylene imine) ethoxylated, such as #1559, available from Poly Sciences Inc., poly (ethylene oxide), such as POLYOX WSRN-3000, available from Union Carbide Company, poly (n-vinyl acetamide-vinyl sulfonate salts), such as #15662, the sodium salt available from Poly Sciences Inc., melamineformaldehyde resins, such as BC 309, available from British Industrial Plastics Limited, urea-formaldehyde resins, such as BC 777, available from British Industrial Plastics limited, styrene-vinylpyrrolidone copolymers, such as #371, available from Scientific Polymer Products, and the like, as well as mixtures thereof.

The first component (hydrophilic polysaccharide) and the second component of the antistatic layer can be present in any effective relative amounts. Typically, the amount of the first component (polysaccharide) in the antistatic layer is from about 50 to about 90 percent by weight and the amount of the second component in the antistatic layer is from about 10 to about 50 percent by weight, with the preferred amount of the first component (polysaccharide) in the antistatic layer being about 75 percent by weight and the preferred amount of the second component being about 25 percent by weight, although the relative amounts can be outside these ranges. Illustrative specific examples of preferred antistatic layer blends include blends of sodium carboxymethyl cellulose, 75 percent by weight, and poly (ethylene oxide), 25 percent by weight; blends of sodium dextran sulfate, 75 percent by weight, and poly (ethylene oxide), 25 percent by weight; blends of sodium alginate, 75 percent by weight, and poly (ethylene oxide), 25 percent by weight; blends of sodium carboxymethyl amylose, 75 percent by weight, and poly (ethylene oxide), 25 percent by weight; blends of sodium carboxymethylhydroxyethyl cellulose, 75 percent by weight, and poly(ethylene oxide), 25 percent by weight; blends of sodium carboxymethylhydroxyethyl cellulose, 75 percent by weight, and poly (ethylene imine-hydroxyethylated) (also known as ethoxylated poly (ethylene imine), 25 percent by weight; blends of hydroxyethyl cellulose, 75 percent by weight, and poly (vinyl alcohol) ethoxylated, 25 percent by weight; blends of carboxymethylhydroxypropyl guar, 75 percent by weight, and melamine-formaldehyde, 25 percent by weight; and blends of cationic cellulosic ethers, 75 percent by weight, and poly (vinyl alcohol), 25 percent by weight.

The antistatic layer can be of any effective thickness; typical thicknesses are from about 1 to about 25 microns and preferably from about 2 to about 10 microns, although the thickness can be outside of these ranges.

The recording sheets of the present invention also comprise at least one toner receiving layer coated on an antistatic layer. The recording sheet can have toner receiving layers on one or both surfaces of the sheet, and when both surfaces contain toner receiving layers, the toner receiving layers can be of the same composition or of different compositions. The toner receiving layers comprise a material selected from the group consisting of maleic anhydride containing polymers, maleic ester containing polymers, and mixtures thereof. Specific examples of suitable toner receiving polymers include poly (maleic anhydride) (such as #2348, available from Poly Sciences Inc. and also available as Belgard EV from Ciba-Geigy Corporation), styrene-maleic anhydride copolymer, such as #3500 with 75 percent styrene content, available from Poly Sciences Inc., also available as Scripset from Monsanto and as SMA series from Arco, p-styrene sulfonic acid-maleic anhydride copolymer, such as #18407 containing 25 percent by weight maleic anhydride, available from Poly Sciences Inc., ethylene-maleic anhydride copolymer, such as #2308, available from Poly Sciences Inc. and also available as EMA from Monsanto Chemical Company, butadiene-maleic anhydride copolymer, such as #7788, available from Poly Sciences Inc. and also available as Maldene from Borg-Warner Company, isobutylene-maleic anhydride, such as ISOBAM, available from Kuraray, 1-octadecene-maleic anhydride copolymer, such as #5152, available from Poly Sciences Inc. and also available as PA-18 from Gulf, methyl vinylether-maleic anhydride, such as #173, available from Scientific Polymer, #7711 available from Poly Sciences Inc., and Gantrez AN resins available from GAF, n-octadecyl vinylether-maleic anhydride copolymers, such as #2589, available from Poly Sciences Inc., vinyl chloride-maleic anhydride copolymer (which can be prepared via free radical polymerization of vinyl chloride and maleic anhydride), vinylmethyl ketone-maleic anhydride copolymer (which can be prepared from solution copolymerization of vinyl methyl ketone and maleic anhydride in aromatic solvents such as toluene with free radical initiators at 100° C.), methyl acrylate-maleic anhydride and methyl methacrylate-maleic anhydride copolymers (which can be prepared from solution copolymerization of the comonomers using an azobisisobutyronitrile initiator at 40° C.), vinylacetate-maleic anhydride copolymers, such as #3347, available from Poly Sciences Inc. and also available as Lytron resins from Monsanto Chemicals, acrylonitrile-maleic anhydride copolymers, such as #4265, available from Poly Sciences Inc., n-vinylpyrrolidone-maleic anhydride copolymers (which can be prepared from free radical solution polymerization of the two comonomers), alkyl vinyl ether-maleic acid monoalkylester where alkyl is methyl, ethyl, isopropyl, or butyl, such as #16291, #16292, and #16293, available from Poly Sciences Inc. and also available as Gantrez ES-225 and Gantrez-425 from GAF Chemicals, styrene-maleic anhydride monomethylmaleate, available as Scripset 520 Resin from Monsanto, and the like, as well as mixtures thereof. When the maleic anhydride polymers are used as mixtures or blends of two polymers as the toner receiving layer, the polymers may be present in any effective relative amounts; for example, when a mixture of two polymers is used, typically from about 10 to about 90 percent by weight of the first polymer and from about 10 to about 90 percent by weight of the second polymer are present, and preferably the amount of the first polymer is from about 25 to about 75 percent by weight and the amount of the second polymer is from about 25 to about 75 percent by weight, although relative amounts outside these ranges can also be used.

Specific examples of preferred toner receiving blends include blends of vinylacetate-maleic anhydride, 50 percent by weight, and ethylene-maleic anhydride, 50 percent by weight; blends of styrene-maleic anhydride, 25 percent by weight, and butadiene-maleic anhydride, 75 percent by weight; blends of styrene-maleic anhydride, 25 percent by weight, and methyl vinyl ether-maleic anhydride, 75 percent by weight; blends of isobutylene-maleic anhydride, 75 percent by weight, and styrene-maleic anhydride, 25 percent by weight; blends of methyl vinyl ether-maleic anhydride, 50 percent by weight, and vinyl acetate-maleic anhydride, 50 percent by weight; blends of octadecyl vinyl ether-maleic anhydride, 50 percent by weight, and styrene-maleic anhydride, 50 percent by weight; blends of 1-octadecene-maleic anhydride, 75 percent by weight, and styrene-maleic anhydride, 25 percent by weight; blends of vinylchloride-maleic anhydride, 25 percent by weight, and methyl acrylate-maleic anhydride, 75 percent by weight; blends of methylmethacrylate-maleic anhydride, 25 percent by weight, and vinylacetate-maleic anhydride, 75 percent by weight; blends of p-styrene sulfonic acid-maleic anhydride, 25 percent by weight, and butadiene-maleic anhydride, 75 percent by weight; blends of acrylonitride-maleic anhydride, 25 percent by weight, and butadiene-maleic anhydride, 75 percent by weight; and the like.

The toner receiving layer or layers can be of any effective thickness. Typical thicknesses are from about 1 to about 25 microns, and preferably from about 5 to about 15 microns, although thicknesses outside of these ranges can also be chosen. In addition, the toner receiving layer can optionally contain filler materials, such as inorganic oxides, including silicon dioxide, titanium dioxide (rutile), and the like, colloidal silicas, such as Syloid™ 74, available from W. R. Grace & Company, calcium carbonate, or the like, as well as mixtures thereof, in any effective amount. Typical amounts of fillers are from about 1 to about 25 percent by weight of the coating composition, and preferably from about 2 to about 10 percent by weight of the coating composition, although other amounts can also be used. When it is desired that the recording sheet of the present invention be transparent, the filler typically is present in an amount of up to about 3 percent by weight. Filler components may be useful as a slip component for feeding the recording sheet through a printing or imaging apparatus, since addition of the filler renders the sheet surface discontinuous, thereby imparting roughness to the surface and making it easy to grip in a machine equipped with pinch rollers.

The coated recording sheets of the present invention can be prepared by any suitable method. For example, the layer coatings can be applied by a number of known techniques, including melt extrusion, reverse roll, solvent extrusion, and dip coating processes. In dip coating, a web of material to be coated is transported below the surface of the coating material by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material is transferred from a steel applicator roll onto the web material to be coated. The metering roll is stationary or is rotating slowly in the direction opposite to that of the applicator roll. In slot extrusion coating, a flat die is used to apply coating materials with the die lips in close proximity to the web of material to be coated. Once the desired amount of coating has been applied to the web, the coating is dried, typically at from about 25° to about 100° C. in an air drier.

One specific example of a process for preparing a coated recording sheet of the present invention entails providing a base sheet such as Mylar® in a thickness of from about 100 to about 125 microns and applying to both sides of the Mylar® by a dip coating process in a thickness of about 1 to about 25 microns an antistatic polymer layer comprising a blend of about 75 percent by weight sodium carboxymethyl cellulose and about 25 percent by weight poly(ethylene oxide), which blend is present in a concentration of about 4 percent by weight in water. Thereafter the coating is air dried at 25° C. and the resulting antistatic polymer layer is overcoated in a thickness of from about 1 to about 25 microns with a toner receiving layer comprising a blend of about 50 percent by weight vinylacetate-maleic anhydride copolymer and about 50 percent by weight ethylene-maleic anhydride copolymer, which blend is present in a concentration of about 5 percent by weight in methanol. Subsequent to air drying at 25° C., the resulting transparency can be used in apparatuses such as the Xerox® 1005®. Other coated recording sheets of the present invention can be prepared in a similar or equivalent manner.

Another specific example of a process for preparing a coated recording sheet of the present invention entails providing a Mylar® base sheet (in roll form) in a thickness of from about 100 to 125 microns and applying to one side of the Mylar® by solvent extrusion techniques on a Faustel Coater, in a thickness of from about 1 to about 25 microns, a blend comprising about 75 percent by weight sodium dextran sulfate and about 25 percent by weight poly(ethylene oxide), which blend is present in a concentration of about 4 percent by weight in water. Subsequent to air drying at 100° C., the resulting antistatic polymer layer is overcoated with a blend comprising about 75 percent by weight isobutylene-maleic anhydride and about 25 percent by weight styrene-maleic anhydride copolymer, which blend is present in a concentration of about 4 percent by weight in acetone, in a thickness of from about 1 to about 25 microns. Subsequent to air drying at 100° C., the two layered coated Mylar® is rewound onto an empty core and the uncoated side of the roll is coated with an antistatic polymer layer comprising a blend of about 75 percent by weight sodium dextran sulfate and about 25 percent by weight poly(ethylene oxide) in a thickness of from about 1 to about 25 microns, which blend is present in a concentration of about 4 percent by weight in water. Subsequent to air drying at 100° C., the resulting antistatic polymer layer is overcoated with a blend comprising about 75 percent by weight isobutylene-maleic anhydride copolymer and about 25 percent by weight styrene-maleic anhydride copolymer, which blend is present in a concentration of about 4 percent by weight in acetone, in a thickness of from about 1 to about 25 microns. Subsequent to air drying at 100° C., the coated Mylar® roll is sheeted into 8½×11 inch cut sheets and the resulting transparencies can be utilized in a xerographic imaging apparatus, such as those available commercially as the Xerox® 1005™, and images can be obtained with optical density values of, for example, 1.6 (black), 0.85 (yellow), 1.45 (magenta), and 1.45 (cyan). Other recording sheets of the present invention can be prepared by similar or equivalent methods.

The present invention also includes printing and imaging processes with recording sheets of the present invention. One embodiment of the present invention is directed to a process for generating images which comprises generating an electrostatic latent image on an imaging member in an imaging apparatus, developing the latent image with a toner, transferring the developed image to a recording sheet of the present invention, and optionally permanently affixing the transferred image to the recording sheet. The electrostatic latent image can be created on a photosensitive imaging member by the well known electrophotographic process, as described in, for example, U.S. Pat. No. 2,297,691 to Chester Carlson. In addition, the electrostatic latent image can be created on a dielectric imaging member by an ionographic process, which entails applying a charge pattern imagewise to an imaging member, developing the image with a toner, and transferring the developed image to a recording sheet. Further, the recording sheet of the present invention can be employed in electrographic printing processes, which entail generating an electrostatic latent image on a recording sheet of the present invention, developing the latent image with a toner, and optionally permanently affixing the developed image to the recording sheet. Ionographic and electrographic processes are well known, and are described in, for example, U.S. Pat. Nos. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, and 4,155,093, the disclosures of each of which are totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmittance and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulus values, and an alphanumeric keyboard for entry of product standard information.

EXAMPLE I

Ten coated transparent recording sheets were prepared by the dip coating process (both sides coated) by providing a Mylar® base sheet in a thickness of 100 microns and coating the base sheet with a blend of 75 percent by weight sodium carboxymethyl cellulose (CMC 7HOF, obtained from Hercules Chemical Company) and 25 percent by weight poly (ethylene oxide) (POLYOX WSRN-3000, obtained from Dow Chemical Company), which blend was present in a concentration of 3 percent by weight in water. Subsequent to air drying at 25° C. and monitoring the weight prior to and subsequent to coating, each of the sheets was coated on each surface with 0.6 grams in a thickness of 6 microns of the antistatic layer. The sheets were then coated on both sides with a toner receiving layer comprising a blend of 50 percent by weight vinyl acetate-maleic anhydride copolymer (#3347, obtained from Poly Sciences Inc.) and 50 percent by weight ethylene-maleic anhydride copolymer (#2308, obtained from Poly Sciences Inc.), which blend was present in a concentration of 3 percent by weight in methanol. Subsequent to air drying at 25° C. and monitoring the weight prior to and subsequent to coating, each of the sheets was coated on each surface with 0.5 gram, in a thickness of 5 microns, of the toner receiving layer. The resulting ten transparencies were then fed individually into a Xerox® 1005 TM color xerographic imaging apparatus. The average optical density of the images obtained was 1.6 (black), 0.75 (yellow), 1.45 (magenta), and 1.40 (cyan). These images could not be handwiped from the transparency surface or lifted off the transparency surface with 3M scotch tape 60 seconds subsequent to their preparation.

EXAMPLE II

Ten transparent coated recording sheets were prepared by the dip coating process (both sides coated) by providing a Mylar® base sheet in a thickness of 100 microns and coating the base sheet with a blend of 80 percent by weight sodium carboxy methyl hydroxyethyl cellulose (CMHEC 37 L, obtained from Hercules Chemical Company) and 20 percent by weight poly (ethyleneimine, hydroxyethylated) (#1559, obtained from Poly Sciences Inc.), which blend was present in a concentration of 3 percent by weight in water. Subsequent to air drying at 25° C. and monitoring the weight prior to and subsequent to coating, each of the sheets was coated on each surface with 0.6 gram, in a thickness of 6.5 microns, of the antistatic layer. The sheets were then coated on both sides with a toner receiving layer comprising a blend of 25 percent by weight styrene-maleic anhydride copolymer (#3500, 75 percent styrene content, obtained from Poly Sciences Inc.) and 75 percent by weight butadiene-maleic anhydride copolymer (#7788, obtained from Poly Sciences Inc.), which blend was present in a concentration of 3 percent by weight in acetone. Subsequent to air drying at 25° C. and monitoring the weight prior to and subsequent to coating, each of the sheets was coated on each surface with 0.7 grams, in a thickness of 7 microns, of the toner receiving layer. These transparencies were then fed individually into a Xerox® 1005 TM color xerographic imaging apparatus. The average optical density of the images obtained was 1.65 (black), 0.80 (yellow), 1.50 (magenta), and 1.40 (cyan). These images could not be handwiped from the transparency surface or lifted off the transparency surface with 3M scotch tape 60 seconds subsequent to their preparation.

EXAMPLE III

Twenty transparent coated recording sheets were prepared by the dip coating process (both sides coated) by providing a Mylar® base sheet in a thickness of 100 microns and coating the base sheet with a blend of 75 percent by weight hydroxyethyl cellulose (Natrosol 250LR, obtained from Hercules Chemical Company) and 25 percent by weight poly (vinyl alcohol) ethoxylated (#6573, obtained from Poly Sciences Inc.), which blend was present in a concentration of 3 percent by weight in water. Subsequent to air drying at 25° C. and monitoring the weight prior to and subsequent to coating, each of the sheets was coated on each surface with 0.45 grams, in a thickness of 5 microns, of the antistatic layer. These sheets were then coated on both sides with a toner receiving layer comprising a blend of 75 percent by weight methyl vinyl ether-maleic anhydride copolymer (#173, 50 percent methyl vinylether, obtained from Scientific Polymer Products) and 25 percent by weight styrene-maleic anhydride (#3500, 75 percent styrene content, obtained from Poly Sciences Inc.), which blend was present in a concentration of 3 percent by weight in acetone. Subsequent to air drying at 25° C. and monitoring the weight prior to and subsequent to coating, each of the sheets was coated on each surface with 0.4 grams, in a thickness of 4 microns, of the toner receiving layer. Ten of the resulting twenty transparencies were fed individually into a Xerox® 1005 TM color xerographic imaging apparatus. The average optical density of the images obtained was 1.5 (black), 0.75 (yellow), 1.50 (magneta), and 1.45 (cyan). The other ten transparencies were fed individually into a Xerox® 1038 TM black only xerographic imaging apparatus. The average optical density of the black image was 1.3. These images could not be handwiped from the transparency surface or lifted off the transparency surface with 3M scotch tape 60 seconds subsequent to their preparation.

EXAMPLE IV

Twenty transparent coated recording sheets were prepared by the solvent extrusion process (single side each time) on a Faustel Coater by providing a Mylar® base sheet (roll form) in a thickness of 100 microns and coating the first side of the base sheet with a blend comprising 75 percent by weight sodium dextran sulfate (#0407, obtained from Poly Sciences Inc.) and 25 percent by weight poly (ethylene oxide) (POLYOX WSRN-3000, obtained from Union Carbide Company), which blend was present in a concentration of 3 percent by weight in water. Subsequent to air drying at 100° C. and monitoring the difference in weight prior to and subsequent to coating, the dried Mylar® roll was coated on the first side with 0.3 grams, 3 microns in thickness, of the antistatic layer. The dried sodium dextran sulfate/polyethylene oxide antistatic layer on the first side was then overcoated with a blend comprising 75 percent by weight isobutylene-maleic anhydride copolymer (ISOBAM, obtained from Kuraray Company) and 25 percent by weight styrene-maleic anhydride copolymer (#3500, 75 percent styrene content, obtained from Poly Sciences Inc.), which blend was present in a concentration of 3 percent by weight in acetone. Subsequent to air drying at a temperature of 100° C. and monitoring the difference in weight prior to and subsequent to coating, the twenty transparent sheets were coated on the first side with 0.3 grams, 3 microns in thickness, of the toner receiving layer. Subsequently, the Mylar® coated on the first side with the antistatic and toner receiving layers was rewound onto an empty core, and the uncoated (second) side of the Mylar® was coated with a blend comprising 75 percent by weight sodium dextran sulfate (#0407, obtained from Poly Sciences Inc.) and 25 percent by weight poly(ethylene oxide) POLY OX WSRN-3000, obtained from Union Carbide Company), which blend was present in a concentration of 3 percent by weight in water. Subsequent to air drying at 100° C. and monitoring the difference in weight prior to and subsequent to coating, the dried Mylar® roll was coated on the second side with 0.3 grams, 3 microns in thickness of the antistatic layer. The dried sodium dextran sulfate/polyethylene oxide antistatic layer on the second side was then overcoated with a blend comprising 50 percent by weight isobutylene-maleic anhydride copolymer (ISOBAM, obtained from Kuraray Company) and 50 percent by weight styrene-maleic anhydride copolymer (#3500, 75 percent styrene content, obtained from Poly Sciences Inc.), which blend was present in a concentration of 3 percent by weight in acetone. Subsequent to air drying at a temperature of 100° C. and monitoring the difference in weight prior to and subsequent to coating, the twenty transparent sheets were coated on the second side with 0.35 grams, 3.5 microns in thickness, of the toner receiving layer. The two-side-coated Mylar® roll was cut into sheet form to obtain 20 transparencies 8.5 inches by 11 inches. Ten of these transparencies were fed individually into a Xerox® 1005™ color xerographic imaging apparatus and the other ten were fed into a Xerox® 1038™ xerographic imaging apparatus. The toner receiving layer comprising the 75:25 blend of isobutylene-maleic anhydride and styrene-maleic anhydride copolymers respectively was imaged with the Xerox® 1005™ and images were obtained on the transparencies with an average optical density of 1.65 (black), 0.90 (yellow), 1.60 (magenta), and 1.50 (cyan). The toner receiving layer comprising the 50:50 blend of isobutylene-maleic anhydride and styrene-maleic anhydride copolymers respectively was imaged with the Xerox® 1038™ xerographic apparatus and black images resulted with an average optical density of 1.35. These images could not be handwiped from the transparency surface or lifted off the transparency surface with 3M scotch tape 60 seconds subsequent to their preparation.

EXAMPLE V

Twenty transparent coated recording sheets were prepared by the solvent extrusion process (single side each time) on a Faustel Coater by providing a Mylar® base sheet (roll form) in a thickness of 100 microns and coating the first side of the base sheet with a blend comprising 75 percent by weight sodium alginate (#032, obtained from Scientific Polymer Products) and 25 percent by weight poly(ethylene oxide) (POLYOX WSRN-3000, obtained from Union Carbide Company), which blend was present in a concentration of 4 percent by weight in water. Subsequent to air drying at 100° C. and monitoring the differences in weight prior to and subsequent to coating, the dried Mylar® roll was coated on the first side with 0.4 grams, 4 microns in thickness, of the antistatic layer. The dried antistatic layer on the first side was then overcoated with methyl vinyl ether-mono ethyl maleate (#16292, obtained from Poly Sciences Inc), which copolymer was present in a concentration of 4 percent by weight in isopropanol. Subsequent to air drying at 100° C. and monitoring the weight prior to and subsequent to coating, the twenty transparent sheets were coated on the first side with 0.4 gram, 4 microns in thickness, of the toner receiving layer. Subsequently, the Mylar® coated on the first side with the antistatic and toner receiving layers was rewound onto an empty core, and the uncoated (second) side of the Mylar® was coated with a blend comprising 75 percent by weight sodium alginate (#032, obtained from Scientific Polymer Products) and 25 percent by weight poly(ethylene oxide) (POLYOX WSRN-3000, obtained from Union Carbide Company), which blend was present in a concentration of 4 percent by weight in water. Subsequent to air drying at 100° C. and monitoring the differences in weight prior to and subsequent to coating, the dried Mylar® roll was coated on the second side with 0.4 grams, 4 microns in thickness, of the antistatic layer. The dried antistatic layer on the second side was then overcoated with methyl vinyl ether-mono butyl maleate (#16291, obtained from Poly Sciences Inc), which copolymer was present in a concentration of 4 percent by weight in isopropanol. Subsequent to air drying at 100° C. and monitoring the weight prior to and subsequent to coating, the twenty transparent sheets were coated on the second side with 0.4 grams, 4 microns in thickness, of the toner receiving layer. The two-side-coated Mylar® roll was cut into sheets to obtain 20 transparencies 8.5 inches by 11 inches. Ten of these transparencies were fed individually into a Xerox® 1005™ color xerographic imaging apparatus and the other ten were fed into a Xerox® 1038™ xerographic imaging apparatus. The toner receiving layer comprising methyl vinyl ether-mono ethylmaleate copolymer was imaged with the Xerox® 1005™ and images were obtained on the transparencies with an average optical density of 1.70 (black), 0.85 (yellow), 1.55 (magenta), and 1.55 (cyan). The toner receiving layer comprising methyl vinylether-mono butyl maleate copolymer was imaged with the Xerox® 1038 TM Xerox apparatus and black images resulted with an average optical density of 1.30. These images could not be handwiped from the transparency surface or lifted off the transparency surface with 3M scotch tape 60 seconds subsequent to their preparation.

EXAMPLE VI (COMPARATIVE)

Ten coated transparency recording sheets were prepared by a dip coating process (both sides coated) by providing a Mylar® base sheet in a thickness of 100 microns and coating the base sheet with an antistatic layer component as disclosed in U.S. Pat. No. 4,997,697 (Malhotra), comprising a solution of sodium carboxymethyl cellulose (CMC 7HOF, obtained from Hercules Chemical Company), which solution was present in a concentration of 3 percent by weight in water. Subsequent to air drying at 25° C. and monitoring the weight prior to and subsequent to coating, each of the sheets was coated on each surface with 0.6 grams, in a thickness of 6 microns per side, of the antistatic layer. These sheets were then coated on both sides with a toner receiving layer of the present invention comprising a blend of 50 percent by weight vinyl acetate-maleic anhydride copolymer (#3347, obtained from Poly Sciences Inc.) and 50 percent by weight ethylene-maleic anhydride copolymer (#2308, obtained from Poly Sciences Inc.), which blend was present in a concentration of 3 percent by weight in methanol. Subsequent to air drying at 25° C. and monitoring the weight prior to and subsequent to coating, each sheet was coated on each surface with 0.5 grams, in a thickness of 5 microns per side, of the toner receiving layer. The resulting ten transparencies were then fed individually into a Xerox® 1005 TM color xerographic imaging apparatus. The average optical density of the images obtained was 1.6 (black), 0.75 (yellow), 1.45 (magenta), and 1.40 (cyan). These images could not be handwiped from the transparency surface. However, when a 3M Scotch® tape was placed on the transparency surface and then pulled off to perform a Scotch® tape toner fix test (testing adhesion of the toner to the recording sheet), the entire coating peeled away from the Mylar® base sheet. In contrast, the coatings were not removed from the base sheet upon application and subsequent removal of Scotch® tape with the recording sheet of Example I, which was coated with the same toner receiving layer and an antistatic layer of the present invention.

EXAMPLE VII (COMPARATIVE)

Ten coated transparency recording sheets were prepared by a dip coating process (both sides coated) by providing a Mylar® base sheet in a thickness of 100 microns and coating the base sheet with an antistatic layer component as disclosed in U.S. Pat. No. 4,997,697 (Malhotra), comprising a solution of hydroxyethyl cellulose (Natrosol 250LR, obtained from Hercules Chemical Company), which solution was present in a concentration of 3 percent by weight in water. Subsequent to air drying at 25° C. and monitoring the weight prior to and subsequent to coating, each of the sheets was coated on each surface with 0.45 grams, in a thickness of 5 microns per side, of the antistatic layer. These sheets were then coated on both sides with a toner receiving layer of the present invention comprising a blend of 75 percent by weight methyl vinyl ether-maleic anhydride copolymer (#173, 50 percent methyl vinylether, obtained from Scientific Polymer Products) and 25 percent by weight styrene-maleic anhydride (#3500, 75 percent styrene content, obtained from Poly Sciences Inc.), which blend was present in a concentration of 3 percent by weight in acetone. Subsequent to air drying at 25° C. and monitoring the weight prior to and subsequent to coating, each of the sheets was coated on each surface with 0.4 grams, in a thickness of 4 microns per side, of the toner receiving layer. These transparencies were fed individually into a Xerox® 1005 TM color xerographic imaging apparatus. The average optical density of the images obtained was 1.5 (black), 0.75 (yellow), 1.50 (magenta), and 1.45 (cyan). These images could not be handwiped from the transparency surface. However, when a 3M Scotch® tape was placed on the transparency surface and then pulled off to perform a Scotch® tape toner fix test (testing adhesion of the toner to the recording sheet), the entire coating peeled away from the Mylar® base sheet. In contrast, the coatings were not removed from the base sheet upon application and subsequent removal of Scotch® tape with the recording sheet of Example III, which was coated with the same toner receiving layer and an antistatic layer of the present invention.

Other embodiments and modifications of the present invention may occur to those skilled in the art subsequent to a review of the information presented herein; these embodiments and modifications, as well as equivalents thereof, are also included within the scope of this invention.

What is claimed is:

1. A recording sheet which comprises a base sheet, an antistatic layer coated on at least one surface of the base sheet comprising a mixture of a first component selected from the group consisting of hydrophilic polysaccharides and mixtures thereof and a second component selected from the group consisting of poly (vinyl amines), poly (vinyl phosphates), poly (vinyl alcohols), poly (vinyl alcohol)-ethoxylated, poly (ethylene imine)-ethoxylated, poly (ethylene oxides), poly (n-vinyl acetamide-vinyl sulfonate salts), melamine-formaldehyde resins, ureaformaldehyde resins, styrene-vinylpyrrolidone copolymers, and mixtures thereof, and at least one toner receiving layer coated on an antistatic layer, said toner receiving layer comprising a material selected from the group consisting of maleic anhydride containing polymers, maleic ester containing polymers, and mixtures thereof.

2. A recording sheet according to claim 1 wherein the first component of the antistatic layer is selected from the group consisting of cellulose ester salts, cellulose ethers, cellulose ether salts, cationic cellulose ethers, cationic hydroxyethyl celluloses, hydroxyalkyl celluloses, substituted deoxycelluloses, dextran polymers, natural ionic gums, protein polymers, n-carboxymethyl amylose salts, and mixtures thereof.

3. A recording sheet according to claim 1 wherein the first component of the antistatic layer is selected from the group consisting of sodium derivatives of cellulose phosphate ester, cellulose phosphate, sodium cellulose sulfate, cellulose carbonate, sodium ethyl cellulose, sodium carboxy methyl cellulose, sodium carboxymethylhydroxyethyl cellulose, carboxymethylmethyl cellulose, carboxymethyl cellulose calcium salt, carboxymethyl cellulose ether sodium salt, carboxymethyl cellulose hydrazide, sodium sulfoethyl cellulose, diethyl aminoethyl cellulose, diethyl ammonium chloride hydroxyethylcellulose, hydroxypropyl triethyl ammonium chloride hydroxyethylcellulose, hydroxyethyl cellulose, hydroxypropyl methyl cellulose, hydroxypropyl hydroxyethyl cellulose, dihydroxypropyl cellulose, chlorodeoxycellulose, amino deoxycellulose, deoxycellulose phosphate, deoxy cellulose phosphonium salt, carboxymethyl dextran, diethyl aminoethyl dextran, dextran sulfate, dextran sulfate potassium salt, dextran sulfate sodium salt, amino dextran, dextran polysulfonate sodium salt, alginic acid sodium salt, alginic acid ammonium salt, alginic acid calcium salt, alginic acid calcium sodium salt, gum arabic, Carrageenan sodium salt, carboxymethyl hydroxypropyl guar, cationic gum guar, Karaya gum, Xanthan gum, Chitosan, dimethylammonium hydrolyzed collagen protein, agar-agar, amino agarose, n-carboxymethyl amylose sodium salt, and mixtures thereof.

4. A recording sheet according to claim 1 wherein the antistatic layer comprises the first component in an amount of from about 50 to about 90 percent by weight and the second component in an amount of from about 10 to about 50 percent by weight.

5. A recording sheet according to claim 1 wherein the antistatic layer comprises a blend of first and second components selected from the group consisting of (a) sodium carboxymethyl cellulose, 75 percent by weight, and poly (ethylene oxide), 25 percent by weight; (b) sodium dextran sulfate, 75 percent by weight, and poly (ethylene oxide), 25 percent by weight; (c) sodium alginate, 75 percent by weight, and poly (ethylene oxide), 25 percent by weight; (d) sodium carboxymethyl amylose, 75 percent by weight, and poly (ethylene oxide), 25 percent by weight; (e) sodium carboxymethyl hydroxy ethyl cellulose, 75 percent by weight, and poly-(ethylene oxide), 25 percent by weight; (f) sodium carboxy methyl hydroxyethyl cellulose, 75 percent by weight, and ethoxylated poly (ethylene imine), 25 percent by weight; (g) hydroxyethyl cellulose, 75 percent by weight, and poly (vinyl alcohol) ethoxylated, 25 percent by weight; (h) carboxymethyl hydroxy propyl guar, 75 percent by weight, and melamine-formaldehyde, 25 percent by weight; and (i) cationic cellulosic ethers, 75 percent by weight, and poly (vinyl alcohol), 25 percent by weight.

6. A recording sheet according to claim 1 wherein the antistatic layer has a thickness of from about 1 to about 25 microns.

7. A recording sheet according to claim 1 wherein the toner receiving layer comprises a material selected from the group consisting of poly (maleic anhydride), styrene-maleic anhydride copolymers, p-styrene sulfonic acid-maleic anhydride copolymers, ethylene-maleic anhydride copolymers, butadiene-maleic anhydride copolymers, isobutylene-maleic anhydride copolymers, 1-octadecene-maleic anhydride copolymers, methyl vinylether-maleic anhydride copolymers, n-octadecyl vinylether-maleic anhydride copolymers, vinyl chloride-maleic anhydride copolymers, vinylmethyl ketone-maleic anhydride copolymers, copolymers of methyl acrylate-maleic anhydride and methyl methacrylate, vinylacetate-maleic anhydride copolymers, acrylonitrile-maleic anhydride copolymers, n-vinylpyrrolidone-maleic anhydride copolymers, alkyl vinyl ether-maleic acid monoalkylester copolymers, styrene-maleic anhydride monomethylmaleate copolymers, and mixtures thereof.

8. A recording sheet according to claim 1 wherein the toner receiving layer comprises a mixture of at least two polymers.

9. A recording sheet according to claim 1 wherein the toner receiving layer comprises a mixture of two polymers, wherein the first polymer is present in an amount of from about 10 to about 90 percent by weight and the second polymer is present in an amount of from about 10 to about 90 percent by weight.

10. A recording sheet according to claim 1 wherein the toner receiving layer has a thickness of from about 1 to about 25 microns.

11. A recording sheet according to claim 1 wherein the toner receiving layer also contains a filler material.

12. A recording sheet according to claim 11 wherein the filler material is present in an amount of from about 1 to about 25 percent by weight of the coating composition.

13. A recording sheet according to claim 11 wherein the filler material is selected from the group consisting of colloidal silica, calcium carbonate, titanium dioxide, clay, and mixtures thereof.

14. A recording sheet according to claim 1 wherein both surfaces of the base sheet are coated with an antistatic layer and both antistatic layers are coated with a toner receiving layer.

15. A recording sheet according to claim 1 wherein the base sheet is transparent.

16. A recording sheet according to claim 1 wherein the base sheet is opaque.

17. A recording sheet according to claim 1 wherein the base sheet has a thickness of from about 50 to about 125 microns.

18. A recording sheet according to claim 1 wherein the base sheet is coated with a first antistatic layer on one surface and coated with a second antistatic layer on a surface opposite to that coated with the first antistatic layer, and wherein the first antistatic layer and the second antistatic layer are not of identical composition.

19. A recording sheet according to claim 1 wherein the base sheet is coated with a first antistatic layer on one surface and coated with a second antistatic layer on a surface opposite to that coated with the first antistatic layer, wherein the first antistatic layer is coated with a first toner receiving layer and the second antistatic layer is coated with a second toner receiving layer, and wherein the first toner receiving layer and the second toner receiving layer are not of identical composition.

20. A recording sheet according to claim 19 wherein the first antistatic layer and the second antistatic layer are not of identical composition.

* * * * *